(12) United States Patent
Wen et al.

(10) Patent No.: US 10,251,058 B2
(45) Date of Patent: Apr. 2, 2019

(54) CROSS-LAYER AUTHENTICATION METHOD BASED ON RADIO FREQUENCY FINGERPRINT

(71) Applicant: University of Electronic Science and Technology of China, Chengdu (CN)

(72) Inventors: Hong Wen, Chengdu (CN); Jinling Zhang, Chengdu (CN); Runfa Liao, Chengdu (CN); Jie Tang, Chengdu (CN); Fei Pan, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 250 days.

(21) Appl. No.: 15/310,780

(22) PCT Filed: Aug. 24, 2015

(86) PCT No.: PCT/CN2015/087880
§ 371 (c)(1),
(2) Date: Nov. 13, 2016

(87) PCT Pub. No.: WO2017/028323
PCT Pub. Date: Feb. 23, 2017

(65) Prior Publication Data
US 2017/0251364 A1    Aug. 31, 2017

(30) Foreign Application Priority Data

Aug. 19, 2015 (CN) .......................... 2015 1 0512638

(51) Int. Cl.
*H04L 29/06* (2006.01)
*H04W 12/06* (2009.01)
*H04L 9/32* (2006.01)
*H04W 72/04* (2009.01)

(52) U.S. Cl.
CPC ........... *H04W 12/06* (2013.01); *H04L 9/3226* (2013.01); *H04L 9/3247* (2013.01); *H04L 2209/80* (2013.01); *H04W 72/0446* (2013.01)

(58) Field of Classification Search
CPC ..................................................... H04W 12/06
See application file for complete search history.

(56) References Cited

U.S. PATENT DOCUMENTS

| 9,674,700 B2 * | 6/2017 | John Archibald .... H04W 12/06 |
| 2002/0104006 A1 * | 8/2002 | Boate .................. H04L 63/0853 713/186 |

(Continued)

FOREIGN PATENT DOCUMENTS

| CN | 101594229 A | 12/2009 |
| CN | 102256249 A | 11/2011 |

(Continued)

OTHER PUBLICATIONS

Fouad, K. A. "Fingerprint Verification System Using Principal Component Transformation Eigenvectors Technique." Iraqi Journal of Science 51.4 (2010): 657-664. (Year: 2010).*

(Continued)

*Primary Examiner* — Shawnchoy Rahman
(74) *Attorney, Agent, or Firm* — Gokalp Bayramoglu

(57) ABSTRACT

A cross layer authentication method based on radio frequency fingerprint, it includes the following steps: S1. In the first time slot, the legitimate transmitter A sends the first packet to the legitimate receiver B, and then B identifies the first data packet by the upper layer authentication; S2. The legitimate recipient B extracts the RF fingerprint eigenvector of the legitimate sender A, and stores it in the memory of the legitimate receiver B; S3. In the next time slot, the sender X sends the second packet to the legitimate receiver B, and the legitimate recipient B extracts the RF fingerprint eigenvector of the sender X; S4. Set sample of the RF fingerprint (Continued)

eigenvector; S5. legitimate receiver B estimates the similarity between the RF fingerprint eigenvector of the sender X and sample of the RF fingerprint eigenvector. This invention is in advantage of low computational complexity, small delay and high precision.

7 Claims, 3 Drawing Sheets

(56) References Cited

U.S. PATENT DOCUMENTS

| | | |
|---|---|---|
| 2007/0005367 A1 | 1/2007 | DeJean et al. |
| 2015/0135293 A1* | 5/2015 | Mookiah ............... H04W 12/12 726/7 |

FOREIGN PATENT DOCUMENTS

| | | | |
|---|---|---|---|
| CN | 102904724 A | | 1/2013 |
| CN | 203204630 U | | 9/2013 |
| KR | 101385929 B1 | * | 4/2014 |

OTHER PUBLICATIONS

Stone, Samuel, and Michael Temple. "Radio-frequency-based anomaly detection for programmable logic controllers in the critical infrastructure." International Journal of Critical Infrastructure Protection 5. 2 (2012): 66-73. (Year: 2012).*

* cited by examiner

| | Sender | Legal Receiver B |
|---|---|---|
| The first time slot | Legal sender A sends the first package $X_i^{AB}$<br>Using private key to make digital signature:<br>$\boxed{PVID_A, X_i^{AB}, SIG_{pSK_A}\{H(X_i^{AB}\|T_i)\}, Cert_A}$ ------> | Legal receiver B verifies the digital signature<br>$\boxed{V_{pbK_A}\{SIG_{pSK_A}\{H(X_i^{AB})\|T_i\}, Cert_A\}}$<br>f the authentication is successful, the radio frequency fingerprint eigenvector of the legitimate sender A $RF_{AB,1}$ will be extracted and stored; if the authentication is failed, present packet will be dropped and the upper layer authentication will be repeated. |
| The second time slot | Sender X sends the second package $X_j^{AB}$<br>$\boxed{X_j^{AB}}$ ------> | Extract eigenvector of sender X $RF_{AB,2}$<br>Using $RF_{AB,1}, RF_{AB,2}$ for radio frequency fingerprint authentication;<br>if radio frequency fingerprint authentication is successful, eigenvector $RF_{AB,2}$ will be stored and X sends next packet to B continuously; if radio frequency fingerprint authentication is failed, the current packet will be dropped, then X sends data packet and the upper layer authentication will be repeated. |
| ⋮ | ⋮ | ⋮ |
| The kth time slot | Sender X sending the Kth package $X_j^{AB}$<br>$\boxed{X_j^{AB}}$ ------> | Extract eigenvector of sender X $RF_{AB,K}$<br>Using $RF_{AB,K}, RF_{AB,K-1},...RF_{AB,K-i}$ for radio frequency fingerprint authentication;<br>if radio frequency fingerprint authentication is successful, eigenvector $RF_{AB,K}$ will be stored and X sends next packet to B continuously; if radio frequency fingerprint authentication is failed, the current packet will be dropped, then X sends data packet and the upper layer authentication will be repeated. |

Figure 3

CROSS-LAYER AUTHENTICATION METHOD BASED ON RADIO FREQUENCY FINGERPRINT

CROSS REFERENCE TO RELATED APPLICATIONS

This application is a national phase entry application of International Application NO. PCT/CN2015/087880, file on Aug. 24, 2015, the entire contents of which are incorporated herein by reference.

TECHNICAL FIELD

This invention relates to the field of information security technology, in particular to a cross-layer authentication method based on radio frequency (RF) fingerprint.

BACKGROUND

The openness of wireless communication network leads to a problem that the attacker is easy to inject malicious data or tamper with the content of the legitimate messages in the process of wireless transmission. Broadcast packets authentication is an effective solution against most of the possible attacks, and it can make the fixed recipient receiving, the expected data. Using, data signature technology based on public key infrastructure (e.g., RSA or DSA) involves intensive computing in the signature verification, leading to serious resource consumption and increasing serious burden to the resource limited mobile devices. With the development of wireless communication, security and privacy risks of mobile electronic commerce become the focus of attention. The mobile terminal, the Wi-Fi network card and RFID tags are in urgent need of certifications of low complexity and low cost. In view of the situation of limited resources, a security scheme of lightweight cipher machine of TESLA technology was put forward. Although TESLA is one of the best known solution, it still requires synchronization between nodes, and vulnerable to denial of service attack. Wherein the attacker blocks the legitimate sender by continuously sending time synchronization request, it harms the safety intensity of lightweight cipher machine. At present, most wireless communication solutions can only authenticate the first frame when the terminal accesses to network, and the following packet cannot be authenticated, which may lead, to a lot of security problems, such as ID tracking, man-in-the-middle attack and malicious node attack, etc.

Recently, some researchers have turned to use the physical information to improve the safety of wireless communication, trying to combine the existing authentication and the physical authentication scheme based on channel information, aim at achieving the lightweight and fast authentication. These researches use the uniqueness of the physical channel response in time and space to make the channel response between communication nodes can only be identified by legitimate sender and receiver like fingerprints, and integrate the existing message authentication scheme and the authentication mechanism of physical layer. However, the time and space uniqueness of communication channel is in the midst of high speed crowded environment; and this method is only applicable to the situation that the time interval between two time slots is less than the coherence time, and the rate of movement is very low. When the time interval between two time slots of the communication parties is greater than the channel coherence time, they need upper layer authentication.

The uniqueness of radio frequency (RF) fingerprint is another important resources which can used to identify the state of the transmitter. This kind of uniqueness is related to electrical components, lines of printed circuit board, internal paths of integrated circuit and high precision and the filter output of high bandwidth of the oscilloscope display of wireless transmitter in RF, and the difference between the instantaneous signals can be reflected. There is a big different between RF fingerprint of equipment from different manufacturers. It is revealed that the RF fingerprints are different even in the same range of wireless network cards; thus RF fingerprint can be used to identity the wireless transmitter.

SUMMARY OF THE INVENTION

This invention aims to overcome the defects of the prior art and provides a cross layer authentication with low complexity, small delay and high precision, which is suitable for resource constrained certification environment.

The object of the present invention is achieved by the following technical solutions: the cross layer authentication method based on RF fingerprint includes the following steps:

S1. In the first time slot, tote legitimate transmitter A sends the first packet to the legitimate receiver B, and then B identifies the first data packet by the upper layer authentication;

If the upper layer authentication is successful, the legitimate sender A and the legitimate receiver B will establish the trust connection between them, and go to S2;

If the upper layer authentication is failed, S1 will be repeated;

S2. The legitimate recipient B extracts the RF fingerprint eigenvector of the legitimate sender A, and stores it in the memory of the legitimate receiver B;

S3. In the next time slot, the sender X sends the second packet to the legitimate receiver B, and the legitimate recipient B extracts the RF fingerprint eigenvector of the sender X;

S4. Set the sample of the RF fingerprint eigenvector;

S5. The legitimate receiver B carries out the RF fingerprint authentication to the RF fingerprint eigenvector of the sender X in S3 according to the RF fingerprint eigenvector, which means estimating the similarity between the RF fingerprint eigenvector of the sender X and the sample of the RF fingerprint eigenvector.

If the similarity is greater than or equal to the set threshold, then the RF fingerprint authentication will be successful. The sender X is the legitimate sender A, and the RF fingerprint eigenvector of the sender X will be stored in the memory of the legitimate receiver B. Then go to S3.

If the similarity is less than the threshold, then the RF fingerprint authentication will be failed. The sender X is the attacker E, and the legitimate receiver B drops the second packet. Then go back to S1.

The upper layer authentication adopts the digital signature authentication based on public key infrastructure or the authentication based on TESLA.

When the digital signature authentication based on the public key infrastructure is used for the upper layer authentication, S1 comprises the following sub-steps:

S11. In the first time slot, an anonymous public key/ private key pair $<pubK_A, priK_A>$ with a certain life cycle is distributed to the legitimate sender A. The certificate of the public key/private key pair <pubK$_A$, pubK$_A$> is Cert$_A$, and the virtual ID of public key/private key pair <pubK$_A$, priK$_A$> is PVID$_A$;

An anonymous public key/private key <pubK$_B$, priK$_B$> with a certain life cycle is distributed to the legitimate sender B. The certificate of the public key/private key pair <pubK$_A$, priK$_A$> is Cert$_B$, and the virtual ID of public key/private key pair <pubK$_A$, priK$_A$> is PVID$_B$;

S12. The legitimate sender A uses its private key priK$_A$ to sign the hash message of the first packet, and the first packet is denoted by X$_1^{AB}$. Then the first packet X$_1^{AB}$ is sent to the legitimate recipient B, that is:

$$A \to B: \langle PVID_A, X_1^{AB}, SIG_{priK_A}[H(X_1^{AB})|T_1], Cert_A \rangle;$$

S13. The legitimate receiver B uses the public key pubK$_A$ to verify the signature of the first packet X$_1^{AB}$ after the legitimate recipient B received the first packet X$_1^{AB}$:

$$V_{pubK_A}\{SIG_{priK_A}[H(X_1^{AB})|T_1], Cert_A\}$$

Here, | is the concatenation operator, and T$_t$ is the current time stamp;

S14. If the signature verification is successful, the legitimate recipient. B will believe that the sender of the first packet X$_1^{AB}$ is the legitimate sender A, then establish the trust connection between the legitimate sender A and the legitimate receiver B;

S15. If the signature verification is failed, the legitimate recipient B will discard the first packet X$_1^{AB}$, and go back to S12.

The legitimate recipient B extracts the RF fingerprint eigenvector of the legitimate sender A and the sender X comprising sub-steps of:

S01. The legitimate receiver B receives the RF signal;

S02. The legitimate receiver B uses the Hilbert transform to parse the received RF signal, then calculates the instantaneous phase of the RF signal, and detects the transient signal by the method of phase detection;

S03. The legitimate receiver B uses the method of wavelet analysis to obtain the instantaneous envelope curve;

S04. The fitting curve is used to deal with the instantaneous envelope curve to get the fitting coefficient, which is to extract the characteristic vector of the fingerprint.

The identifier used in the RF fingerprint authentication in S5 is SVM identifier or BP neural network identifier.

The test algorithm of the RF fingerprint authentication in S5 is likelihood ratio test method or sequential probability ratio test method.

The threshold value should be set before S5.

The sample of the RF fingerprint eigenvector includes one or more RF fingerprint eigenvector stored in the memory of the legitimate receiver B in S4.

The beneficial effects of this invention are:

(1) The upper layer authentication which adopts the digital signature authentication based on public key infrastructure or the authentication based on TESLA is only used to authenticate the first packet for establishing the trust connection between the legitimate sender A and the legitimate receiver B. Certification of the subsequent data packets is achieved via RF fingerprint authentication with low computational complexity and small delay;

(2) Since the RF fingerprint eigenvector will not change with time, the time interval between two time slots can be up to several hours or even days on the condition that RF fingerprint authentication failure does not occur and the communication always be connected;

(3) In the entire communication process, differences of RF fingerprint eigenvector between the instantaneous signals can be reflected. So attacker E has no access to obtain RF fingerprint eigenvector of legitimate sender A which legitimate recipient B extracted, and can't tamper, forward, or forge the packet legitimate transmitter A sending, which ensures the security of communications.

BRIEF DESCRIPTION OF THE DRAWINGS

FIG. 3 is an embodiment of the cross-layer authentication method based on radio frequency fingerprint.

DETAILED DESCRIPTION

The technical solution of the present invention will be described in further detail with reference to the accompanying drawings, but the scope of the present invention is not limited to the following described.

Figure 1:
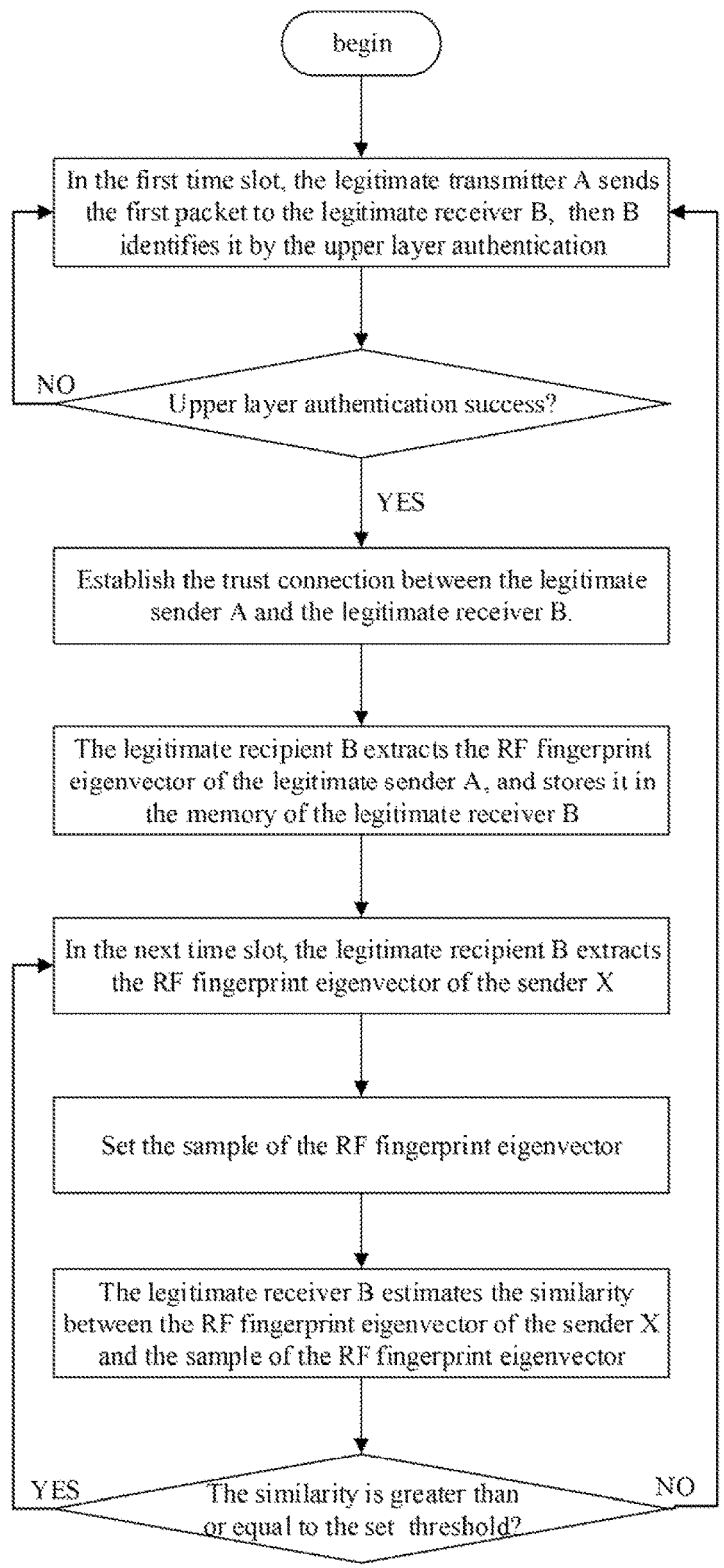
FIG. 1 is a flow chart of the cross-layer authentication method based on radio frequency fingerprint.

As shown in FIG. 1, the cross layer authentication method based on RF fingerprint includes the following steps:

S1. In the first time slot, the legitimate transmitter A sends the first packet to the legitimate receiver B, and then B identifies the first data packet by the upper layer authentication;

If the upper layer authentication is successful, the legitimate sender A and the legitimate receiver B will establish the trust connection between them, and go to S2;

If the upper layer authentication is failed, S1 will be repeated.

The upper layer authentication adopts the digital signature authentication based on public key infrastructure or the authentication based on TESLA.

When the digital signature authentication based on the public key infrastructure is used for the upper layer authentication. S1 comprises the following sub-steps:

S11. In the first time slot, an anonymous public key/private key pair <pubK$_A$, priK$_A$> with a certain life cycle is distributed to the legitimate sender A. The certificate of the public key/private key pair <pubK$_A$, priK$_A$> is Cert$_A$, and the virtual ID of public key/private key pair <pubK$_A$, priK$_A$> is PVID$_A$;

An anonymous public key/private key <pubK$_B$, priK$_B$> with a certain life cycle is distributed to the legitimate sender B. The certificate of the public key/private key pair <pubK$_A$, priK$_A$> is Cert$_B$, and the virtual ID of public key/private key pair <pubK$_A$, priK$_A$> is PVID$_B$.

S12. The legitimate sender A uses its private key priK$_A$ to sign the hash message of the first packet, and the first packet is denoted by X$_1^{AB}$. Then the first packet X$_1^{AB}$ is sent to the legitimate recipient B, that is:

$$A \to B: \langle PVID_A, X_1^{AB}, SIG_{priK_A}[H(X_1^{AB})|T_1], Cert_A \rangle$$

S13. The legitimate receiver B uses the public key pubK$_A$ to verify the signature of the first packet X$_1^{AB}$ after the legitimate recipient B received the first packet X$_1^{AB}$:

$$V_{pubK_A}\{SIG_{priK_A}[H(X_1^{AB})|T_1], Cert_A\}$$

Here, | is the concatenation operator, and T$_1$ is the current time stamp.

S14. If the signature verification is successful, the legitimate recipient B will believe that the sender of the first packet. X$_1^{AB}$ is the legitimate sender A, then establish the trust connection between the legitimate sender A and the legitimate receiver B;

S15. If the signature verification is failed, the legitimate recipient B will discard the first packet $X_1^{AB}$, and go back to S12.

S2. The legitimate recipient B extracts the RF fingerprint eigenvector of the legitimate sender A, and stores it in the memory of the legitimate receiver B.

S3. In the next time slot, the sender X sends the second packet to the legitimate receiver B, and the legitimate recipient B extracts the RF fingerprint eigenvector of the sender X.

Figure 2:
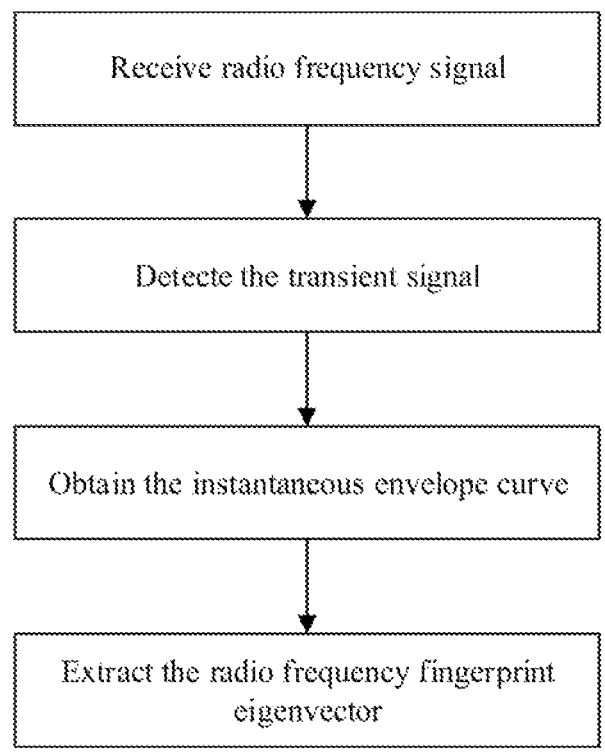
FIG. 2 is a flow chart of extracting the radio frequency fingerprint eigenvector.

As shown in FIG. 2 the legitimate recipient B extracts the RF fingerprint eigenvector of the legitimate sender A and the sender X comprising steps of:

S01. The legitimate receiver B receives the RF signal;

S02. The legitimate receiver B uses the Hilbert transform to parse the received RF signal, then calculates the instantaneous phase of the RF signal, and detects the transient signal by the method of phase detection;

S03. The legitimate receiver B uses the method of wavelet analysis to obtain the instantaneous envelope curve;

S04. The fitting curve is used to deal with the instantaneous envelope crime to get the fitting coefficient, which is to extract the characteristic vector of the fingerprint.

S4. Set the sample of the RF fingerprint eigenvector. The sample of the RF fingerprint eigenvector includes one or more RF fingerprint eigenvector stored in the memory of the legitimate receiver B in S4, which means that legitimate receiver B uses the sample from the k-S-1th RF fingerprint eigenvector to the k-1th RF fingerprint eigenvector to estimate the similarity between the kth RF fingerprint eigenvector and the sample. And the value of S is determined by the test algorithm.

S5. The legitimate receiver B carries out the RF fingerprint authentication to the RF fingerprint eigenvector of the sender X in S3 according to the RF fingerprint eigenvector which means estimating the similarity between the RF fingerprint eigenvector of the sender X and the sample of the RF fingerprint eigenvector.

If the similarity is greater than or equal to the set threshold, then the RF fingerprint authentication will be successful. The sender X is the legitimate sender A, and the RF fingerprint eigenvector of the sender X will be stored in the memory of the legitimate receiver B. Then go to S3.

If the similarity is less than the threshold, then the RF fingerprint authentication will be failed. The sender X is the attacker F, and the legitimate receiver B drops the second packet. Then go back to S1.

The identifier used in the RF fingerprint authentication in S5 is SVM identifier or BP neural network identifier. The legitimate receiver B uses the SVM identifier and the BP neural network identifier to identify the RF fingerprint eigenvector according to the RF fingerprint feature vector sample, thereby performing RF fingerprint verification on the received data packet.

The test algorithm of the RF fingerprint authentication in S5 is likelihood ratio test method or sequential probability ratio test method. The test algorithm determines the RF fingerprint eigenvectors contained in the RF fingerprint eigenvector sample.

The threshold value should be set before S5.

The upper layer authentication which adopts the digital signature authentication based on public key infrastructure or the authentication based on TESLA is only used to authenticate the first packet for establishing the trust connection between the legitimate sender A and the legitimate receiver B. Certification of the subsequent data packets is achieved via RF fingerprint authentication with low computational complexity and small delay:

Since the RF fingerprint eigenvector will not change with time, the time interval between two time slots can be up to several hours or even days on the condition that RF fingerprint authentication failure does not occur and the communication always be connected. In the entire communication process, differences of RF fingerprint eigenvector between the instantaneous signals can be reflected. So attacker E has no access to obtain RF fingerprint eigenvector of legitimate sender A which legitimate recipient B extracted, and can't tamper, forward, or forge the packet legitimate transmitter A sending, which ensures the security of communications.

As shown in FIG. 3, in the first time slot, the legitimate transmitter A sends the first packet $X_1^{AB}$ to the legitimate receiver B, and then B identifies the first data packet by the digital signature authentication based on public key infrastructure: if the authentication is successful, the RF fingerprint eigenvector of the legitimate sender A $RF_{AB,1}$ will be extracted and stored; if the authentication is failed, present packet will be dropped, then the legitimate transmitter A will resend the first packet and the legitimate receiver B identifies the first data packet by the digital signature authentication based on public key infrastructure.

In the second tune slot, the transmitter X sends the second packet $X_2^{AB}$ to the legitimate receiver B, and then B extracts the RF fingerprint eigenvector of the sender X $RF_{AB,2}$. The legitimate receiver B adopts likelihood ratio test method or sequential probability ratio test method to authenticate the RF fingerprint eigenvector $RF_{AB,2}$ according to the RF fingerprint eigenvector $RF_{AB,2}$: if the RF fingerprint authentication is successful, the RF fingerprint eigenvector $RF_{AB,2}$ will be stored, and the transmitter X sends next packet to the legitimate receiver B; if the RF fingerprint authentication is failed, present packet will be dropped, then the legitimate transmitter A will resend the first packet and the legitimate receiver B identifies the first data packet by the digital signature authentication based on public key infrastructure.

In the kth time slot, the transmitter X sends the kth packet $X_k^{AB}$ to the legitimate receiver B, and then B extracts the RF fingerprint eigenvector of the sender X $RF_{AB,k}$. The legitimate receiver B adopts likelihood ratio test method or sequential probability ratio test method to authenticate the RF fingerprint eigenvector $RF_{AB,2}$ according to the RF fingerprint eigenvector $RF_{AB,k-1}, \ldots, RF_{AB,k-S-1}$ where the value of S is determined by the test algorithm: if the RF fingerprint authentication is successful, the RF fingerprint eigenvector $RF_{AB,k}$ will be stored, and the transmitter X sends next packet to the legitimate receiver B; if the RF fingerprint authentication is failed, present packet will be dropped, then the legitimate transmitter A will resend the first packet and the legitimate receiver B identifies the first data packet by the digital signature authentication based on public key infrastructure.

The invention claimed is:

1. A cross layer authentication method based on radio frequency (RF) fingerprint, wherein the method includes the following steps:

step 1, in a first time slot, a legitimate sender A sends a first packet to a legitimate receiver B, and then B identifies the first data packet by an upper layer authentication;

if the upper layer authentication is successful, the legitimate sender A and the legitimate receiver B will establish a trust connection between them, and go to step 2;

if the upper layer authentication is failed, repeat step 1;

step 2, the legitimate receiver B extracts a RF fingerprint eigenvector of the legitimate sender A, and stores it in a memory of the legitimate receiver B;

step 3, in the next time slot, a sender X sends a second packet to the legitimate receiver B, and the legitimate receiver B extracts the RF fingerprint eigenvector of the sender X;

step 4, set a sample of the RF fingerprint eigenvector;

step 5, the legitimate receiver B carries out a RF fingerprint authentication to the RF fingerprint eigenvector of the sender X in step 3 according to the RF fingerprint eigenvector, and estimates the similarity between the RF fingerprint eigenvector of the sender X and the sample of the RF fingerprint eigenvector;

if the similarity is greater than or equal to a set threshold, then the RF fingerprint authentication will be successful; the sender X is the legitimate sender A, and the RF fingerprint eigenvector of the sender X will be stored in the memory of the legitimate receiver B, then go to step 3;

if the similarity is less than the threshold, then the RF fingerprint authentication will be failed; the sender X is an attacker E, and the legitimate receiver B drops the second packet, then go back to step 1;

wherein a test algorithm of the RF fingerprint authentication in the step 5 is a likelihood ratio test method or a sequential probability ratio test method.

2. The cross layer authentication method based on RF fingerprint according to the claim 1, wherein the upper layer authentication adopts a digital signature authentication based on public key infrastructure or the authentication based on Transparent Extensible Session Layer Architecture (TESLA).

3. The cross layer authentication method based on RF fingerprint according to the claim 2, wherein when the digital signature authentication based on the public key infrastructure is used for the upper layer authentication, the step 1 comprises the following sub-steps:

sub-step 11, in the first time slot, an anonymous public key/private key pair $<pubK_A, priK_A>$ with a certain life cycle is distributed to the legitimate sender A; a certificate of the public key/private key pair $<pubK_A, priK_A>$ is $Cert_A$, and a virtual ID of public key/private key pair $<pubK_A, priK_A>$ is $PVID_A$;

an anonymous public key/private key $<pubK_B, priK_B>$ with a certain life cycle is distributed to the legitimate sender B; the certificate of the public key/private key pair $<pubK_A, priK_A>$ is $Cert_B$, and the virtual ID of public key/private key pair $<pubK_A, priK_A>$ is $PVID_B$;

sub-step 12, the legitimate sender A uses its private key $priK_A$ to sign a hash message of the first packet, and the first packet is denoted by $X_1^{AB}$, then the first packet $X_1^{AB}$ is sent to the legitimate receiver B, that is:

$$A \rightarrow B: <PVID_A, X_1^{AB}, SIG_{priK_A}[H(X_1^{AB})|T_1], Cert_A>;$$

sub-step 13, the legitimate receiver B uses the public key $pubK_A$ to verify the signature of the first packet $X_1^{AB}$ after the legitimate receiver B received the first packet $X_1^{AB}$:

$$V_{pubK_A}\{SIG_{priK_A}[H(X_1^{AB})|T_1], Cert_A\}$$

here, | is the concatenation operator, and $T_1$ is the current time stamp;

sub-step 14, if the signature verification is successful, the legitimate receiver B establishes that the sender of the first packet $X_1^{AB}$ is the legitimate sender A, then establish the trust connection between the legitimate sender A and the legitimate receiver B;

sub-step 15, if the signature verification is failed, the legitimate receiver B will discard the first packet $X_1^{AB}$, and go back to the sub-step 12.

4. The cross layer authentication method based on RF fingerprint according to the claim 1, wherein the legitimate receiver B extracts the RF fingerprint eigenvector of the legitimate sender A and the sender X comprising sub-steps of:

sub-step 01, the legitimate receiver B receives an RF signal;

sub-step 02, the legitimate receiver B uses the Hilbert transform to parse the received RF signal, then calculates an instantaneous phase of the RF signal, and detects a transient signal by a method of phase detection;

sub-step 03, the legitimate receiver B uses a method of wavelet analysis to obtain an instantaneous envelope curve;

sub-step 04, a fitting curve is used to deal with the instantaneous envelope curve to get a fitting coefficient, which is to extract a characteristic vector of the fingerprint.

5. The cross layer authentication method based on RF fingerprint according to the claim 1, wherein an identifier used in the RF fingerprint authentication in the step 5 is support vector machine (SVM) identifier or back propagation (BP) neural network identifier.

6. The cross layer authentication method based on RF fingerprint according to the claim 1, wherein a threshold value should be set before the step 5.

7. The cross layer authentication method based on RF fingerprint according to the claim 1, wherein the sample of the RF fingerprint eigenvector includes one or more RF fingerprint eigenvector stored in the memory of the legitimate receiver B in the step 4.

* * * * *